Oct. 29, 1929.   H. S. TAYLOR   1,733,839
REAPER THRASHER AND LIKE HARVESTING MACHINE
Original Filed Dec. 16, 1925   2 Sheets-Sheet 1
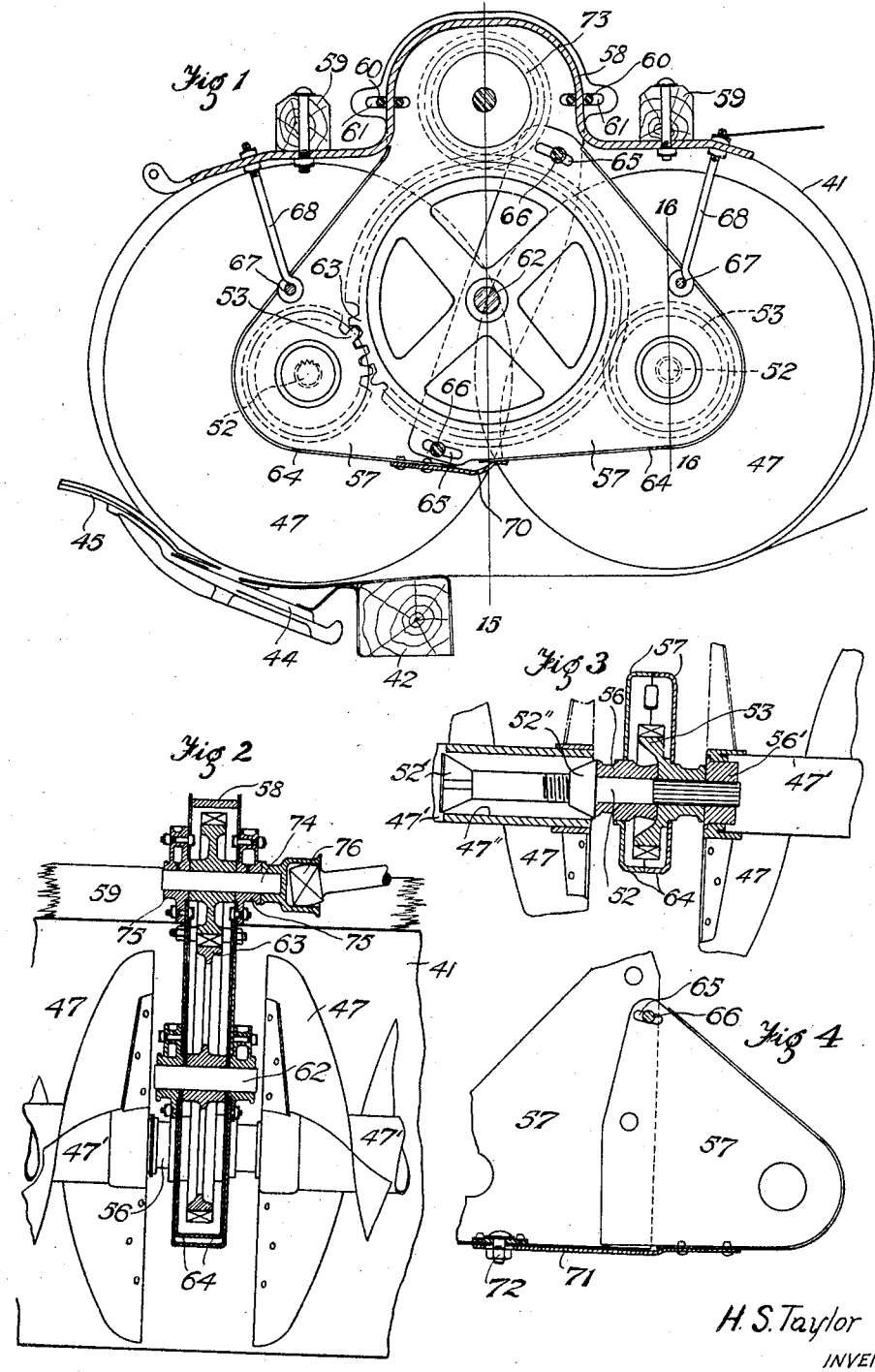

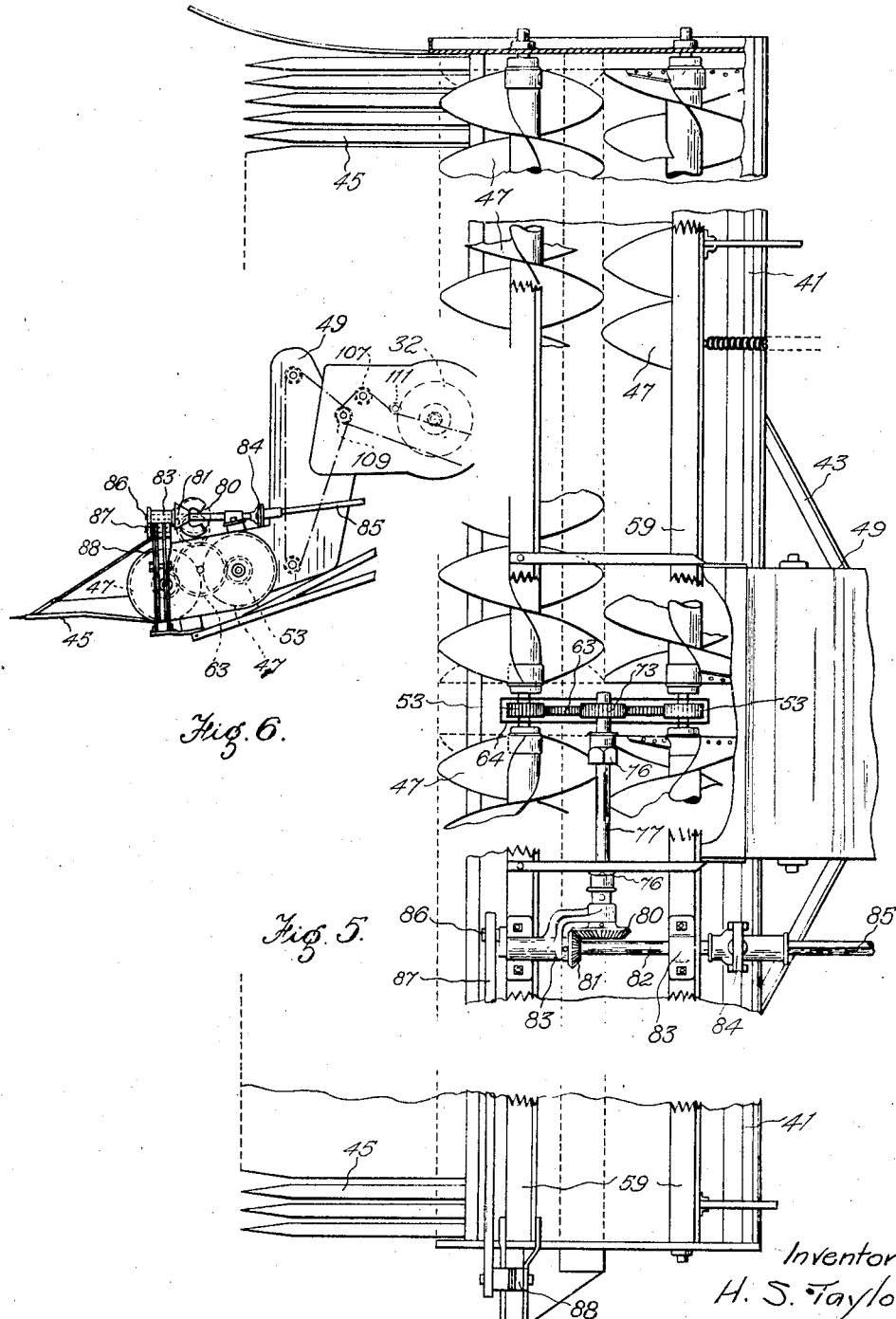

Patented Oct. 29, 1929

1,733,839

UNITED STATES PATENT OFFICE

HEADLIE SHIPARD TAYLOR, OF SUNSHINE, VICTORIA, AUSTRALIA, ASSIGNOR TO H. V. McKAY PROPRIETARY LIMITED, OF SUNSHINE, VICTORIA, AUSTRALIA

REAPER THRASHER AND LIKE HARVESTING MACHINE

Original application filed December 16, 1925, Serial No. 75,837, and in Australia December 20, 1924. Divided and this application filed June 28, 1927. Serial No. 202,146.

This invention relates to improvements in reaper thrasher and harvesting machines and refers especially but is not limited to that type of machine wherein the heads of crop are removed by a reciprocating knife and are then thrashed and winnowed to recover the grain therefrom.

The invention is directed more particularly to the provision of improvements in an engine driven reaper thrasher of the "straight draught" type wherein the comb and crop gathering mechanism extend across the full width of the machine and direct the severed heads of crop and straw to an elevator leading to a thrasher associated with a winnowing apparatus situated at the rear of the main frame which is provided with forward main transport wheels and with one or more rear steering wheels.

This application is a division of my application Serial No. 75,837, filed December 16, 1925.

The object of the present invention is to provide improvements in crop gathering and conveying mechanism which is mounted on an adjustable frame and embodies opposed helical conveying members whereby the said conveying members can be operated efficiently from their inner ends or at points in line with the elevator for directing the gathered crop to the thrasher, and whereby the conveying members can be readily adjusted to suit the kind or condition of crop being harvested.

I accomplish the abovementioned object by providing a comb and conveyor casing transversely on the front end of the adjustable frame, a pair of helical conveyors at each end of the conveyor casing supported on spindles rotatively mounted in the ends of the said casing, spindles adjustably connecting the inner ends of the opposed helical conveyors, a bracket fitted to the conveyor casing intermediate the ends thereof, adjustable bearings on the bracket and supporting the spindles connecting the inner ends of the opposed conveyors, pinions on the spindles, a gear wheel rotatively supported by one of the adjustable bearing members and meshing with the pinions, means for imparting motion to the gear wheel to cause the helical conveyors to rotate in the same direction and means for adjusting the supports for the spindles of the helical conveyors whereby the latter can be adjusted with respect to the bottom of the conveyor casing.

The gearing for imparting motion to the helical conveyors can be operated from a convenient part of the mechanism of the machine.

In order that the invention may be readily understood, reference will now be had to the accompanying sheets of explanatory drawings wherein:

Figure 1 is a view in sectional side elevation of a casing supporting the crop gathering mechanism and illustrates the gearing for imparting rotation to the helical conveyors operating therein.

Figure 2 is a view in sectional front elevation taken on the dotted line 15—15 of Figure 1.

Figure 3 is a view in sectional front elevation taken on the dotted line 16—16 of Figure 1.

Figure 4 is a view in sectional side elevation of part of a modified form of casing or housing for the gearing for transmitting motion to the helical conveyors of the crop gathering mechanism.

Figure 5 is a view in plan showing the apparatus for imparting motion to the crop gathering and conveying mechanism.

Figure 6 is a view in side elevation of the crop gathering mechanism and elevator, drawn to a smaller scale.

In these drawings the numeral 1 designates the main frame of the machine upon the front of which is mounted an adjustable frame 43 carrying the crop gathering mechanism.

The crop gathering mechanism consists of a conveyor casing 41 mounted on a transverse beam 42 pivotally supported on the forward end of the adjustable frame 43 having its rear end pivotally connected to a transverse axle or to a suitable part of the main frame.

The comb bar 44 is fitted beneath the conveyor casing 41 and projecting forwardly from the said comb bar is a comb 45 of ordinary design.

A knife is mounted reciprocatingly at the base of the comb to sever the straw passing rearwardly between the teeth thereof and the knife may be constructed and operated in any well known way.

A pair of helical conveyors 47 are mounted transversely in each end of the conveyor casing and are constructed in such a manner that the material severed by the knife will be carried to the lower part of an elevator 48 fitted to and communicating with the back of the said casing and arranged to deliver the material to a thrasher drum (not shown). The helical conveyors in each end of the casing preferably are arranged to intermesh slightly with each other but it will be obvious that they can be parallel to each other and not in mesh.

The front helical conveyor of each pair extends in advance of the base of the comb and above the reaping knife which is arranged in the ordinary way. The helical vanes of the front section of each pair of conveyors when rotating serve to bend the straw (passing rearwardly between the fingers of the comb to the knife) inwardly toward the center of the casing and hold it while the knife is severing the heads from the stalk.

The action of the front sections of the opposed pairs of conveyors besides holding the straw while being severed from the stalk assists the rear sections in feeding the straw toward the lower end of the elevator 48.

Thus it will be understood that the front sections of the opposed pairs of helical conveyors 47 serve a dual purpose, namely, holding the straw while it is being cut by the knife and assisting the rear sections to feed the cut material to the elevator.

The employment of double helical conveyors operating as above described enables a large quantity of straw to be conveyed and as the adjacent sides of the front and rear sections move in different directions all liability of the front sections carrying the straw upwardly and to the front of the machine is obviated. The amount of straw severed by the knife varies according to the condition of the crop being harvested and it has been found that these different conditions call for a variation in the positions of the sections of the conveyor relatively with the bottom of the casing and with each other if the most satisfactory work is to be produced.

The present invention enables this adjustment to be readily effected without in any way adversely affecting the mechanism for transmitting motion to the conveyors.

The inner ends of the helical conveyors 47 are connected by spindles 52 which are provided with pinions 53 adapted to be operated from a shaft 85 disposed longitudinally on the main frame. The pinions 53 on the spindles 52 of the conveyors are supported by bearings 56 carried by a casing formed of side plates 57 which are adjustably fitted to a supporting bracket 58 secured to the casing of the transverse conveyor.

The helical conveyors 47 are mounted on tubular supports 47′ and the spindles 52 supporting the ends of the said conveyors are provided at one end with a conical shaped head 52′ and with a threaded portion adapted to take a conical nut 52″. The conical heads and nuts are adapted to bear against the ends of sleeves 47″ fitted within the inner ends of the tubular supports for two sections of the helical conveyor.

The spindles 52 are securely fastened axially within the inner ends of the said tubular supports by tightening up the conical nuts 55″ and a reduced portion of the said spindle extends through the bearing 56, the bosses of the pinions 53 and into bosses 56′ rigidly supported within the inner ends of the tubular supports 47′ of the other sections of the helical conveyors (see Figure 3).

Those portions of the spindles 52 which pass through the bosses of the pinions and into the bosses 56′ are provided with longitudinally disposed flutes which are adapted to be neatly accommodated in correspondingly shaped ribs formed longitudinally in the bosses of the said pinions and the bosses 56′ in the tubular supporting members 47′ of the helical conveyors.

The flutings and ribs enable the helical conveyors to be adjusted angularly so that the pair of conveyors on each side of the driving gear will be in correct relationship and the front and rear conveyors will be correctly located when they are arranged to intermesh one with the other. Said adjustment is effected by removing the conveyors provided with the bosses 56′ and turning them into their required positions and then slipping the bosses over the fluted ends of the said spindles 52.

The supporting bracket 58 is bolted to reinforcing bars 59 extending across the top of the conveyor casing or is mounted in any other approved way. The side plates 57 are made in two front and two rear sections, the front sections of the plates are clamped to the bracket 58 by bolts 60 or the like and are slotted as at 61 to permit of them being adjusted to various positions when the nuts on the said bolts 60 are slackened.

The forward parts of the rear sections of the side plates are arranged to lie inside of the rear parts of the front sections, and the over-lapping portions of the rear sections of the side plates pivot on a spindle 62 supporting a centrally disposed gear wheel 63 which meshes with the pinions 53 fitted to the spindles 52 on the inner ends of the helical conveyors 47 located in the conveyor casing.

The edges of the side plates 57 are formed with inwardly projecting flanges 64, which, together with the supporting bracket 58 prevent the ingress of material to the space therebetween.

The overlapping portions of the rear sections of the side plates are provided with slots 65 which are formed concentrically with the spindle 62 and these slots accommodate bolts 66 which pass through the overlapping portions of the front section of the side plates. If preferred the slots can be made in the rear sections and the bolts can be passed through the holes in the front sections of the side plates.

The front and rear sections of the housing formed by the flanged side plates 57 are provided with transversely disposed bolts 67 to which are pivoted the lower ends of eyebolts 68 having their upper and screw ends passing through forward and rearward extensions 69 on the bracket 58.

When the nuts on the bolts 66 are loosened the nuts on the eye-bolts can be adjusted to permit of the front and rear sections of the housing formed by the side plates and the supports for the inner ends of the spiral conveyors to be raised or lowered as desired.

In some instances it may be found necessary to loosen the nuts on the bolts 60 to permit of the upper part of the housing adjusting itself with respect to the bracket 58 when the nuts on the eye bolts 68 are being adjusted.

The pinions 53 are maintained correctly in mesh with the gear wheel 63 throughout any angular adjustment of the former in respect to the latter, and when the parts have been adjusted as desired the nuts on the bolts 60, 66 and eye bolts 68 are tightened to retain the parts fixedly in position.

The flanges on the lower parts of the overlapping portions of the two sections of the side plates are cut away to permit of the adjustment above described and the space left by the removal of these parts of the said flanges is covered by a resilient plate 70 which is secured to the front section, as shown in Figure 1, or to the back section as desired.

It will be readily understood that either the front or the back sections of the side plates can be adjusted independently of the other if such is required.

A housing and gearing constructed and arranged as above described occupies a minimum of space within the conveyor casing and therefore presents a minimum of obstruction to the passage of the straw and heads to the elevator leading to the thrasher drum.

If preferred, the rear sections of the side plates can be constructed and arranged as shown in Figure 4 of the drawings in which case only one slotted hole 65 is formed at the upper edge on the overlapping portions and a metal strap 71 is securely fastened to the inwardly projecting flange on the lower part of one or both of the said rear sections and the forward end of the said strap is slotted to take a bolt 72 passing through a flange on the lower edge of one or both of the front sections of the side plates. The slots in the strap and in the front sections of the side plates are to enable the rear sections to be adjusted easily with respect to the front plates or vice versa. By suitably adjusting either or both sections of the side plates the helical conveyors can be arranged to operate with a maximum efficiency under various conditions.

The gear wheel 63 meshing with the pinions 53 on the spindles of the transverse conveyors meshes with a pinion 73 supported on a spindle 74 passing through bearings 75 in the upper part of the front sections of the side plates and this spindle is connected by universal joints 76 on a short shaft 77 to a spindle 78 mounted in a bracket 79 on the reinforcing bars 59 passing across the top of the conveyor casing.

The spindle 78 supported in the bracket 79 is fitted with a bevel wheel 80 which meshes with a like wheel 81 fitted to a shaft 82 supported at right angles thereto in bearings 83 and connected by a universal joint 84 to a shaft 85 which is driven from any approved operative part of the machine.

In the foregoing specification I have described the preferred construction and arrangement of parts but as various slight modifications of the parts may be readily effected by persons skilled in the art without departing from the spirit and scope of the invention, I do not wish to be understood as limiting myself to the positive terms employed in the description.

I claim:

1. In machines of the class described, an adjustable frame supporting a comb and a conveyor casing transversely on the front thereof, two pairs of opposed helical conveyors rotatively supported within the casing, the front section of each pair being disposed above the base of the comb, means for supporting the outer and inner ends of the opposed helical conveyors, and gearing associated with the inner ends of the opposed conveyors and adapted to impart rotation thereto in the same direction.

2. In machines of the class described, an adjustable frame supporting a comb and a conveyor casing transversely on the front thereof, two pairs of opposed helical conveyors rotatively supported within the conveyor casing, spindles adjustably connecting the inner ends of both pairs of helical conveyors, an elevator passing from the back of the conveyor casing in line with the inner ends of the helical conveyors, pinions fitted to the spindles, a gear wheel meshing with the pinions on the spindles of the helical conveyors, and means for imparting rotation to the said gear wheel.

3. In machines of the class described, an adjustable frame supporting a comb and conveyor casing transversely on the front thereof, two pair of opposed helical conveyors rotatively supported within the conveyor casing with the front section of each pair disposed above the base of the comb, bearings in the ends of the casing supporting the outer ends of the conveyors, spindles adjustably connecting the inner ends of the opposed conveyors, and gear wheels supported on the said spindles and adapted to be driven to rotate both pairs of helical conveyors in the same direction and to convey the straw and material entering the casing towards the inner ends of the said conveyors.

4. In machines of the class described, an adjustable frame supporting a comb and conveyor casing transversely on the front thereof, a pair of helical conveyors rotatively supported in each end of the conveyor casing, spindles adjustably connecting the inner ends of the conveyors, adjustable bearings for the spindles, means for adjusting the bearings to raise or lower the helical conveyors, pinions on the spindles, and mechanism for imparting motion to the pinions to rotate the conveyors in the same direction.

5. In machines of the class described, an adjustable frame having a comb and conveyor casing supported transversely on the front thereof, a pair of helical conveyors in each end of the conveyor casing, spindles on the outer ends of the said helical conveyors rotatively supported in the ends of the casing, spindles connecting the inner ends of opposed helical conveyors of each pair, a bracket fitted to the conveyor casing at a point intermediate the ends thereof, adjustable bearings fitted to said bracket and supporting the spindles connecting the inner ends of the opposed conveyors, pinions fitted to the spindles, a gear wheel rotatively supported by one of the adjustable bearings and meshing with the pinions, means for imparting motion to the gear wheel to cause the helical conveyors to rotate in the same direction, and means for adjusting the supports for the spindles on the inner ends of the helical conveyors whereby said helical conveyors can be adjusted with respect to the bottom of the conveyor casing and to each other.

6. In machines of the class described, a transverse conveyor casing having a crop gathering comb projecting forwardly therefrom, a bracket fitted to the top of the casing intermediate the ends thereof, a pair of side plates formed of front and rear sections, one of said sections being secured to the bracket, a spindle passing through overlapping portions of the front and rear sections of the said plates, a gear wheel mounted on said spindle, a pair of helical conveyors mounted in each end of the conveyor casing and adapted to convey material towards the side plates supporting the gear wheel, spindles connecting the inner ends of the helical conveyors and passing through the front and rear sections of the side plates, pinions fitted to the said spindles and meshing with the gear wheel, means for adjustably connecting the front and rear sections of the side plates whereby the inner ends of the conveyors can be adjusted to and from the bottom of the conveyor casing and with respect to each other, and means for imparting rotation to the gear wheel whereby the helical conveyors will be rotated in the same direction.

7. In machines of the class described, an adjustable frame supporting a comb and conveyor casing transversely thereon, a pair of helical conveyors in each end of the casing, spindles on the outer ends of the conveyors mounted in bearings on the ends of the casing, spindles connecting the inner ends of the conveyors, gearing on the spindles connecting the inner ends of the conveyors and adapted to impart rotation to the same, a housing for the gearing comprising flanged side plates formed in two sections, bearings supported by the side plates for the gearing imparting rotation to the helical conveyors, and means for adjusting the front and rear sections whereby the height of the helical conveyors can be adjusted relatively to the bottom of the conveyor casing and with respect to each other.

8. In machines of the class described, the combination with the subject matter of claim 7, of a supporting bracket, means for adjustably connecting the upper part of the front sections of the side plates to the supporting bracket, eye bolts connecting the forward ends of the front sections of the side plates adjustably to a forward part of the bracket, arcuate slots in the rear parts of the front sections of the side plates, bolts passing through the overlapping front ends of the rear sections of the side plates and engaged by the arcuate slots in the front sections of the side plates, and eye bolts connecting the rear sections of the side plates adjustably to the rear part of the bracket.

9. In machines of the class described the combination with the subject matter of claim 7, of inwardly projecting flanges on the front and rear sections of the side plates adapted to prevent the ingress of material to the gearing housed therein, an opening between the bottom of the side plates to permit of the front and rear sections being adjusted to and from each other, and means for covering the opening between the lower parts of the two sections of the side plates.

10. In machines of the class described, a transverse conveyor casing having an opening in the front thereof, an opening in the back of the casing, a pair of helical conveyors arranged in each end of the conveyor casing and adapted to deliver heads and straw to the opening in the back thereof, bearings for the helical conveyors in the ends of the conveyor casing, spindles connecting the inner ends of the opposed pairs of conveyors, pinions on the spindles, adjustable bearings supporting the spindles carrying the pinions, an intermediate gear wheel meshing with the pinions on the spindles of the helical conveyors, and means for imparting motion to said intermediate wheel to cause the said helical conveyors to rotate in the same direction.

11. In machines of the class described, a conveyor casing having a comb projecting forwardly therefrom, a pair of helical conveyors in each end of the conveyor casing, spindles connecting the inner ends of the opposed helical conveyors, bearings for the spindles, pinions fitted to the said spindles, a pair of side plates formed of front and rear sections supporting the bearings for the said spindles, the front sections of the side plates being mounted on an upper part of the conveyor casing, an adjustable connection between the rear sections and the front sections of the side plates, a spindle rotatively supported in bearings carried by the front sections of the side plates, a gear wheel mounted on the said spindle and meshing with the pinions on the spindles on the inner ends of the opposed conveyors, and a driving pinion meshing with the gear wheel.

12. In machines of the class described, the combination with the subject matter of claim 11, of a shaft disposed longitudinally above the conveyor casing, bevel gearing for transmitting motion from the said shaft to a shaft supporting the pinion meshing with the intermediate gear wheel, and a longitudinal drive shaft connected by a universal joint to the shaft supported above the conveyor casing.

13. In machines of the class described, an adjustable frame supporting a transverse conveyor casing, opposed helical conveyors rotatively supported in the conveyor casing, spindles on the outer ends of the helical conveyors mounted in bearings in the ends of the casing, spindles fitted rigidly in the inner ends of one pair of conveyors and adjustably connected to the inner ends of the opposed pair of conveyors whereby one pair of conveyors can be adjusted angularly with respect to the other, and means associated with the spindles connecting the inner ends of the opposed conveyors for imparting rotation thereto.

14. In machines of the class described, the combination with the subject matter of claim 13, of a series of longitudinal flutes on the free ends of the spindles connecting the opposed conveyors, and bosses in the ends of the conveyors removably connected to the spindles and provided with internally disposed ribs adapted to mesh with the flutes on the spindles.

15. In machines of the class described, the combination with the subject matter of claim 13 of tubular supports for the opposed helical conveyors, bearings rotatively supporting the outer ends of the helical conveyors, sleeves fitted rigidly in the inner ends of the tubular supports of one pair of conveyors, spindles having conical heads adapted to bear against the inner ends of the sleeves, conical nuts on the spindles adapted to be screwed up to bear against the outer ends of the sleeves, a series of flutes on the outer ends of the spindles, bosses in the inner ends of the tubular supports for the second mentioned pair of conveyors, ribs in the bosses adapted to be accommodated by the flutes on the spindles, and gear wheels mounted on the spindles for imparting rotation to the helical conveyors.

16. In machines of the class described the combination with the subject matter of claim 13, of pinions fitted over the spindles and having their bosses provided with longitudinally disposed ribs, flutes formed longitudinally on the spindles and adapted to mesh with the ribs in the bosses, and gearing for imparting motion to the pinions.

In witness whereof I hereunto affix my signature.

HEADLIE SHIPARD TAYLOR.